April 1, 1969     L. R. SPARROW ET AL     3,436,610
ENCAPSULATED CAPACITOR
Original Filed June 4, 1964

INVENTORS
LAWRENCE R. SPARROW
BY JERRY BRAIMAN

ATTORNEY

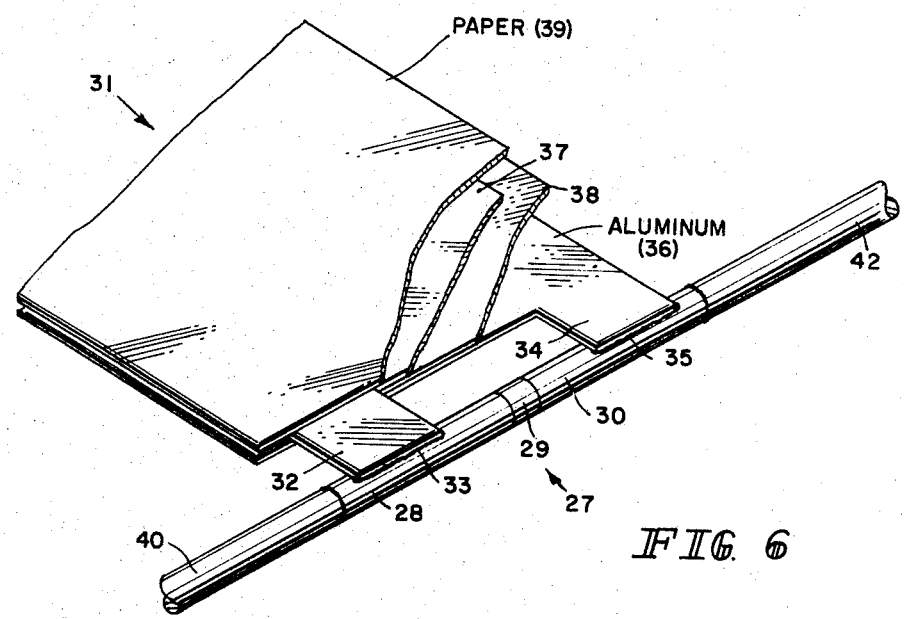
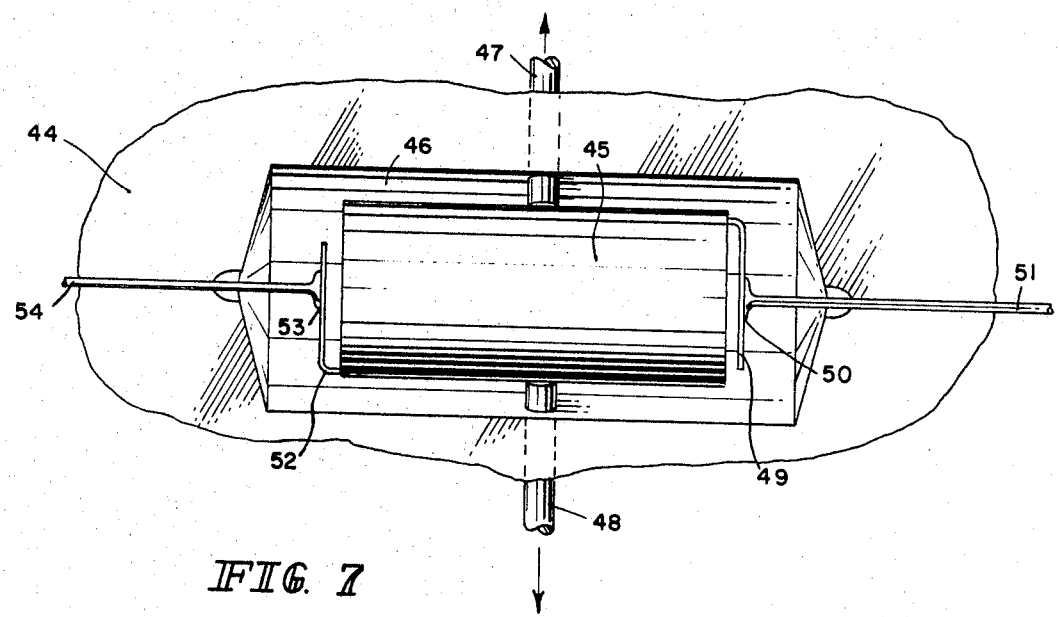

United States Patent Office 3,436,610
Patented Apr. 1, 1969

3,436,610
ENCAPSULATED CAPACITOR
Lawrence R. Sparrow and Jerry Braiman, Indianapolis, Ind., assignors to P. R. Mallory & Co., Inc., Indianapolis, Ind., a corporation of Delaware
Continuation of application Ser. No. 372,611, June 4, 1964. This application Dec. 21, 1967, Ser. No. 692,614
Int. Cl. H01g 9/08
U.S. Cl. 317—230     13 Claims

ABSTRACT OF THE DISCLOSURE

An encapsulated electrolytic capacitor comprising a spindle including a pair of flanges. A capacitor body is convolutely wound on the spindle. The capacitor body further includes an electrolyte which has been introduced to the capacitor body through at least one of said flanges. A substantially solid mass of material substantially encapsulates said spindle means and the capacitor body.

---

Figure 1:
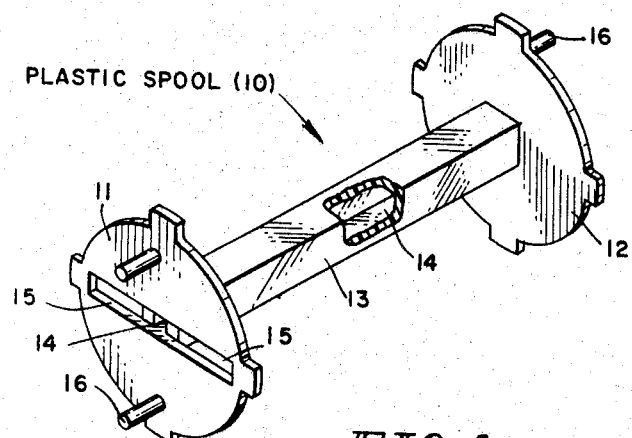

This application is a continuation of Ser. No. 372,611, filed June 4, 1964, now abandoned.

This invention relates to electrolytic devices and more particularly relates to means and methods for providing a seal for electrolytic capacitors by encapsulation.

It is known in the art to provide seals for aluminum electrolytic capacitors by means of encapsulating the wound capacitor body with cast or molded plastics. The development of new and improved molding techniques has afforder flexibility in the methods by which encapsulation may be accomplished. However, it is not known in prior art to mold directly to the wet wound capacitor body. There are known methods wherein the wound capacitor body is placed in a premolded plastic sleeve, a plug or stopper is inserted into the hollow ends of said sleeve to provide a sealing means, and a mass of plastic is injected over the plug to increase the sealing effect. This provides a presealed capacitor which is packaged in plastic as described in the Miquelis patent, U.S. No. 2,970,182, issued Jan. 31, 1961. There are further means known in the art wherein the wound capacitor body is placed in a premolded plastic sleeve, said sleeve providing means for supporting and centering the capacitor in a mold cavity and further insuring a plastic case of unified thickness surrounding the capacitor body, and wherein plastic end seals are therein provided. Although the aforementioned means provide adequate seals, production costs are such that they subtract from the practicality of the device.

Therefore, a long-standing need has existed for means and methods whereby an encapsulated capacitor assembly having superior physical, mechanical and electrical properties can be economically produced with a high degree of reliability. The present invention meets that need and thereby contributes to the advancement of capacitor art.

It is therefore, an object of the present invention to provide a novel and economical encapsulated capacitor which overcomes each of the aforementioned disadvantages of prior art.

It is an object of the present invention to provide an encapsulated capacitor with a homogeneous casing having excellent mechanical rigidity, high resistance to heat distortion, outstanding low temperature physical characteristics, and low moisture absorption and transmission rates.

Another object of the present invention is to provide a single step molding operation, wherein the wet capacitor is directly molded, thus eliminating the need for a premolded sleeve.

It is an object of the present invention to provide a molding technique wherein the molding tools may be adapted to various lengths thereby providing an additional cost advantage.

It is an object of the present invention to encapsulate the capacitor body with a material which is initially inexpensive and which has a further economical advantage of the molding scrap therefrom being reusable.

It is an object of the present invention to provide a rigid, economical means for holding, positioning and centering the capacitor body in the mold cavity.

It is an object of the present invention to provide a better seal for molded capacitors by utilizing a tit which is part of the integral mold structure.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects and advantages of the present invention will become apparent from the following description considered in conjunction with the accompanying figures of the drawings and wherein like reference characters describe elements of similar functions therein and wherein the scope of the invention is defined by the appended claims.

Figure 2:
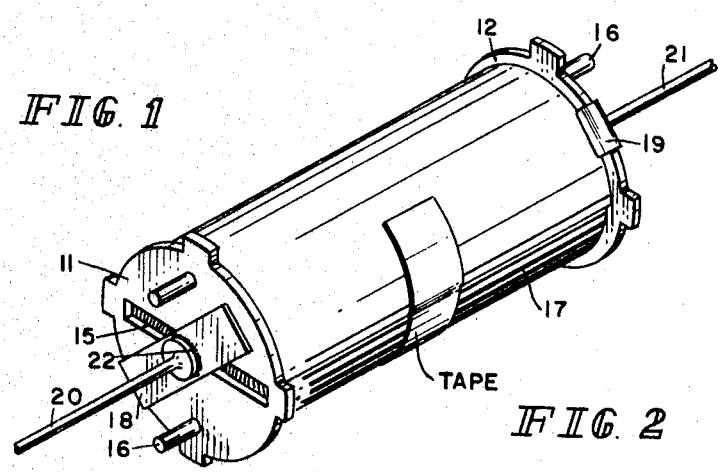
Figure 3:
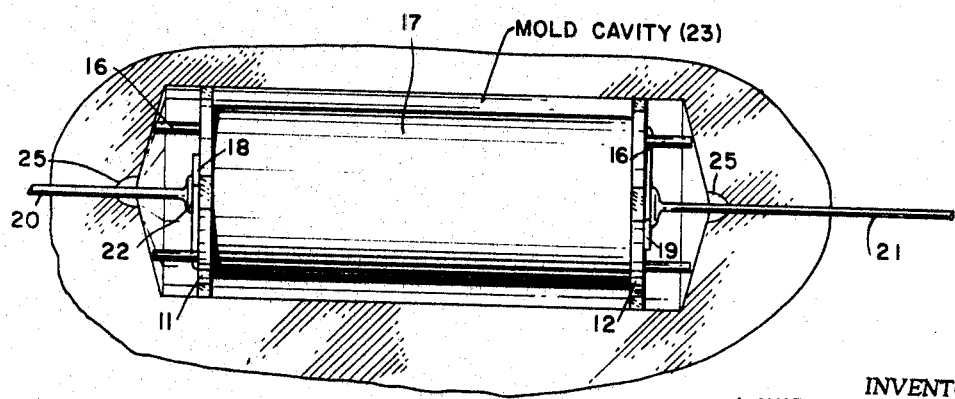
Figure 4:
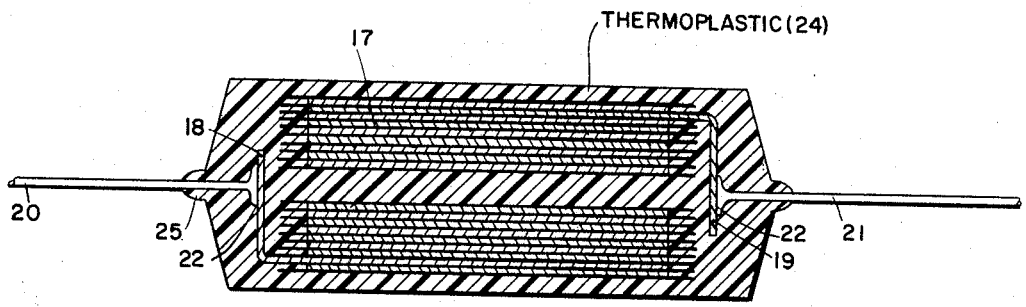
Figure 5:
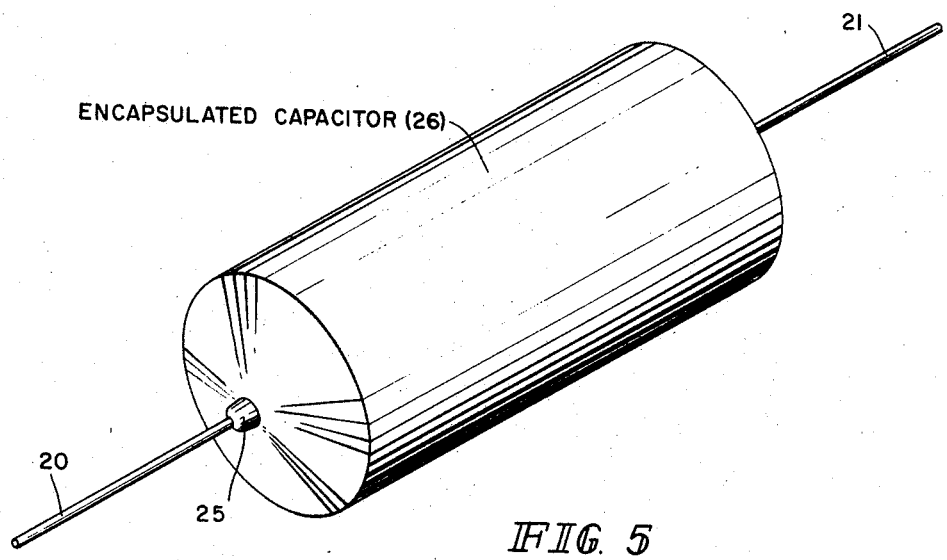

In the drawings:
FIGURE 1 is a view in perspective of the premolded spool.
FIGURE 2 is a view in perspective of the wound capacitor body.
FIGURE 3 is a top view of the capacitor body inserted in the mold cavity.
FIGURE 4 is a cross sectional view of the capacitor after molding.
FIGURE 5 is a view in perspective of the completed encapsulated capacitor.
FIGURE 6 is view in perspective of an alternative rigid positioning means.
FIGURE 7 is a top view of the mold cavity having rigid, retractable positioning means therein.

Generally speaking, the present invention provides the means and methods for economically encapsulating a capacitor body wtih a thermoplastic in a one step molding process. The aluminum capacitor is wound around a preformed plastic spool, thus forming the capacitor body. The wound capacitor is then impregnated with a suitable electrolyte, and the wet, impregnated capacitor is positioned in the mold cavity. A suitable plastic of composition similar or compatible with the spool is placed in a heated cylinder and pressure is then applied forcing the plastic material into the mold cavity. Although injection, transfer and compression molding are known in the art, injection molding is by far the most economical, and by utilizing the preformed spool and injection molding, the process is so simplified over prior art that overall costs may be reduced 20 to 30%.

The present invention provides a better seal for molded capacitors by utilizing a tit which is part of the molded structure. Further means for insuring the seal will become apparent in the following description of the accompanying drawings.

Referring now to the drawings, preformed plastic spool 10 has first flange 11 and second flange 12, flanges 11 and 12 being connected by spindle 13. First flange 12 has apertured therethrough a bore 14 for accepting winding mandrel (not shown) bore 14 traversing spindle 13 and flange 12. Flange 11 has apertures 15 for electrolyte impregnation after winding. Flanges 11 and 12 have positioning means 16 for alignment and placement in the mold cavity (FIGURE 3). Spool 10 is positioned on a capacitor winding mandrel (not shown) and the resulting structure of the wound capacitor body 17 is shown in FIGURE 2.

The convolutely wound capacitor body 17 shown in FIGURE 2 is substantially cylindrical in shape, and is usually no more than a fraction of an inch in diameter and usually not more than two inches long, sometimes being considerably less than one inch in length. However, the device is not limited to this size. The illustrative example herein shown contemplates an aluminum foil sheet interwound with an absorbent material such as paper, and employing a semi-viscous liquid electrolyte, such as a compounded mixture principally consisting of ethylene glycol and boric acid, although not limited to such. Said electrolyte is introduced through apertures 15 of flange 11 thereby impregnating the absorbent material in situ. After electrolyte impregnation, the metal capacitor tabs 18 and 19 are bent across flanges 11 and 12 respectively in such a way as to insure that there be no contact between the electrolyte-impregnated capacitor body 17, and weld junction 22. This physical separation insures freedom from electrolyte attack and/or corrosion at the weld junction 22 between capacitor tabs 18 and 19 and their respective terminal wires or elements 20 and 21. The injection of plastic in the encapsulation process further guarantees separation of the weld junction 22 from the electrolyte thereby preventing contact of junction 22 with the electrolyte.

After electrolyte impregnation and welding of terminal wires 20 and 21, the wound capacitor unit 17 is oriented inside mold cavity 23, positioning being assured by positioning means 16. The encapsulation is then completed by injection molding of the same or similar thermoplastic material comprising premolded spool 10 into the mold cavity 23 through mold gates (not shown) said thermoplastic material 24 (FIGURE 4) being introduced in a precise molten condition so as to effect complete coalescence with the preformed spool 10, said operation producing a homogeneous housing of thermoplastic material having superior protective properties. An important feature of the mold cavity 23 is the tit or node 25 which mechanically insures a good seal. Owing to the shrinkage characteristics of thermoplastics, an extension 0.040 inch to 0.200 inch long and 0.004 inch to 0.040 thick per side about the wire insures a seal.

FIGURE 4 is a cross sectional view of the final encapsulated capacitor 26, showing the unitary and homogeneous housing of plastic material 24. It can be readily seen that the plastic 24 forms a seal between the wet capacitor body 17 and capacitor tabs 18 and 19 and guarantees encapsulation of weld joints 22 thereby preventing contact between junction 22 and the electrolyte which would result in corrosion of the weld.

The view in perspective of the encapsulated capacitor 26 shown in FIGURE 5 reveals the smooth, compact and functional appearance of the capacitor 26, with only terminal wires 20 and 21 and molded sealing tit 25 projecting therefrom. It has been found that no special plugging provisions are necessary for insuring tightness of the end seal around terminal wires 20 and 21 as the end closure material effects a secure bond thereto.

Although the plastic spool 10 (FIGURE 1) provides the most economical means for rigid alignment and placement of the wound capacitor body 17 in the mold cavity 23 (FIGURE 3), there are alternative positioning means which would provide adequate support and allow the encapsulation of a wet wound electrolytic capacitor. FIGURE 6 shows a view in perspective of one such alternative, said alternative comprising a rigid bar 27 comprising cathode section 28, insulator 29 and anode section 30. The capacitor body 31 is wound onto bar 27 after cathode tab 32 is welded to cathode portion 28 of bar 27 at junction 33, and anode tab 34 is welded to anode portion 30 of bar 27 at junction 35. The capacitor body 31 comprising anode strip 36 and cathode strip 37, strips 36 and 37 being separated by paper strips 38 and 39 is wound onto bar 27. Cathode lead 40 which may be the same diameter as bar 27 as shown in FIGURE 6 or of smaller diameter, is welded to cathode portion 28 at junction 41. Anode lead 42 is welded to anode portion 30 at junction 43. The wound capacitor body (not shown) is positioned and supported in the mold by the leads 40 and 42 which are now rigid, or by means of bar 27 which can be lengthened so as to extend beyond the capacitor body.

Another means for supporting and centering the capacitor body in the mold structure may be provided by positioning retractable supporting means within the mold cavity rather than having the positioning means as an integral part of the capacitor body. FIGURE 7, a top view of mold 44, shows means for positioning capacitor body 45 within mold cavity 46, positioning means 47 and 48 being an integral part of mold 44. To position capacitor 45 within mold cavity 46 retractable pins 47 and 48 are so positioned as to secure capacitor and leads 51 and 54 insure centering. After plastic has been injected into the mold cavity 46, but before the plastic hardens, positioning means 47 and 48 are retracted so that a unified plastic casing may be achieved. It should be noted that capacitor 45 has capacitor tabs 49 and 52 separated from capacitor body 45 so that electrolyte corrosion at welds 50 and 53 will not occur.

Although the positioning means shown in FIGURES 6 and 7 produce the desired result, the most economical means for producing encapsulated capacitors as herein disclosed entails the use of the preformed plastic spool.

Successful encapsulation by the injection molding process utilized in the present invention has been consistently repeated with a number of thermoplastic materials, such as polyproylene and polyethylene. However, the specific choice of thermoplastic material depends upon the required operating temperature range.

It was previously thought in prior art that successful encapsulation with the aforementioned thermoplastic materials could not be accomplished by ordinary thermoplastic compositions, and that in order to obtain desired linear coefficients of thermal expansion and the desired quality of fusion it was necessary to utilize a thermoplastic containing fibrous filler material of a specific size and quality. However, it has been found by the inventors that the aforementioned fiber-filling is not necessary when the process and design as herein described are utilized.

The molding, which may be accomplished by injection, transfer or compression molding takes place between 250° F.–700° F. dependeng upon the material used. While any of the aforementioned molding techniques may be used the inventors prefer the injection molding techniques, as they are the most economical methods. The molding process simplifies the operation, thereby lowering costs and is unique in that it provides a method of obtaining a good seal on wet items.

Suitable thermoplastic materials include but are not limited to polypropylene, polyethylene, polystyrene, polycarbonate. It is further possible to use epoxy, diallyl phthalates, phenolic or any other thermosetting resin capable of molding.

Through the present invention, therefore, is disclosed the means and methods for producing an efficient, economical and reliable molded capacitor, encapsulated with polypropylene, polyethylene or any other thermoplastic or thermosetting resin, having the following specific advantages: Low production cost; low differential expansion between the encasement material and the terminal wires; high heat distortion level so as to resist soldering heat; superior molding characteristics which provide a unified molded unit; extremely low moisture absorption; high impact strength and rigidity; wide operating temperature range; reusability of all molding scrap; and is readily adaptable to commercial capacitors.

An example of a specific molding process suitable for the present invention comprises the utilization of an automatic 3 ounce screw injection molding press wherein spool wound capacitor bodies are positioned in a multicavity mold, thus enabling a plurality of capacitor bodies to be simultaneously molded. The molding operation, although automatic must be performed under rigid control of temperature and pressure to prevent degradation of the plastic, excessive internal pressures within the mold, to allow for complete cavity fill, and provide the necessary seals.

The molding process of the present invention allows the using of any desired coloring to identify polarity and further, prevents inadvertent contact between the electrolyte and the connector parts, thus avoiding corrosive effects thereupon.

The encapsulated capacitor of the present invention as herein described is merely illustrative and not exhaustive in scope. Since many widely different embodiments of the invention may be made without departing from the scope thereof and will be readily apparent to those skilled in the art, it is intended that all matter contained in the above description and shown in the accompanying drawings shall be interposed as illustrative and not in a limited sense. We consider all of these variations and modifications to be within the foregoing description and defined by the appended claims.

Having thus described our invention, we claim:

1. An encapsulated electrolytic capacitor comprising an electrically insulative spindle means including a pair of spaced apart flanges, a capacitor body having electrodes disposed on said spindle means including dielectric sheets interleaved between said electrodes, said capacitor body further including a semi-viscous electrolyte impregnated in situ through at least one of said flanges, a substantially solid mass of electrically insulative material substantially encapsulating said spindle means and said capacitor body and being substantially coalesced with said spindle means, and terminal means extending from said electrodes through the encapsulating material.

2. An encapsulated capacitor according to claim 1, wherein said encapsulating mass and said spindle means are fabricated substantially from polypropylene, wherein said electrodes of said capacitor body include convolutely wound aluminum foil sheets, wherein said electrolyte contains a solvent of ethylene glycol and a solute of boric acid, and wherein at least the anode terminal means includes a sealing node formed therearound to substantially seal around said anode terminal means.

3. An encapsulated capacitor according to claim 1, wherein said encapsulating mass and said spindle means are organic plastic materials.

4. An encapsulated capacitor according to claim 3, wherein at least one of said organic plastic materials is a thermoplastic material selected from the group consisting of polypropylene, polyethylene, polystyrene and polycarbonate or a thermosetting resin selected from the group consisting of epoxy, diallyl phthalates and phenolic.

5. An encapsulated capacitor according to claim 3, wherein said encapsulating mass includes at least one node formed around the anode terminal means to substantially seal around said anode terminal means.

6. An encapsulated capacitor according to claim 1, wherein said spaced apart flanges are positioned at the ends of said spindle means, each of said flanges including means for positioning said spindle means in relation to said encapsulating mass, said means for positioning said spindle means substantially completely coalescing with said encapsulating mass.

7. An encapsulated capacitor according to claim 6, wherein said means for positioning said spindle means comprise a plurality of means projecting from each of said flanges.

8. An encapsulated capacitor according to claim 7, wherein at least one of said plurality of projecting means extends radially from said flanges and at least one of said projecting means extends axially from said flanges.

9. An encapsulated capacitor according to claim 8, wherein said projecting means are integral with said flanges.

10. An encapsulated capacitor according to claim 6, wherein said capacitor body is convolutely wound on said spindle means between said spaced apart flanges.

11. An encapsulated capacitor according to claim 6, wherein said capacitor body includes a plurality of tab means positioned over said flanges, said terminal means being connected to said tab means.

12. An encapsulated capacitor according to claim 6, wherein at least one of said flanges is provided with an aperture for facilitating the introduction of said electrolyte to said capacitor body.

13. An encapsulated capacitor according to claim 6, wherein said spindle means includes a bore extending through at least one of said flanges for receiving a winding mandrel.

References Cited

UNITED STATES PATENTS

| | | | |
|---|---|---|---|
| 2,042,044 | 5/1936 | Garstang | 317—230 |
| 2,064,819 | 12/1936 | Burlingame | 317—260 |
| 2,078,772 | 4/1937 | Pitt | 317—230 |
| 2,388,139 | 10/1945 | Grause et al. | |
| 2,533,716 | 12/1950 | Coursey | 317—260 |
| 2,922,090 | 1/1960 | Carrou | 317—230 |
| 2,949,640 | 8/1960 | Collins et al. | 317—258 |
| 2,970,182 | 1/1961 | Miquelis | 317—230 |
| 3,020,453 | 2/1962 | Hogue | 317—260 |
| 3,058,040 | 10/1962 | Wellington | 317—230 |
| 3,070,647 | 12/1962 | Solow et al. | 317—230 |
| 3,221,089 | 11/1965 | Cotton | 264—272 |
| 3,261,902 | 7/1966 | Pearce et al. | 264—272 |

JAMES D. KALLAM, *Primary Examiner.*

U.S. Cl. X.R.

317—260; 264—272